(12) United States Patent
Engelhardt (10) Patent No.: US 9,030,744 B2
(45) Date of Patent: May 12, 2015

(54) FABRICATION OF MICRO LENSES

(75) Inventor: Manfred Engelhardt, Villach-Landskron (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/235,707

(22) Filed: Sep. 19, 2011

(65) Prior Publication Data

US 2013/0070343 A1    Mar. 21, 2013

(51) Int. Cl.
G02B 27/10 (2006.01)
G02B 3/00 (2006.01)
G02B 3/06 (2006.01)
B29D 11/00 (2006.01)

(52) U.S. Cl.
CPC ............ G02B 3/0012 (2013.01); G02B 3/06 (2013.01); B29D 11/00298 (2013.01)

(58) Field of Classification Search
USPC .................................. 359/619, 620
See application file for complete search history.

(56) References Cited

U.S. PATENT DOCUMENTS

| 6,414,343 | B1 | 7/2002 | Kondo et al. |
| 6,583,438 | B1 | 6/2003 | Uchida |
| 7,642,118 | B2 | 1/2010 | Cho |
| 2002/0058350 | A1 | 5/2002 | Kim |
| 2005/0139832 | A1 | 6/2005 | Jeon |
| 2006/0176565 | A1 | 8/2006 | Nagao |
| 2008/0043336 | A1* | 2/2008 | Liao ............................ 359/619 |
| 2008/0130139 | A1 | 6/2008 | Oohara et al. |
| 2008/0160665 | A1 | 7/2008 | Cho |
| 2009/0096050 | A1 | 4/2009 | Park |
| 2009/0121371 | A1 | 5/2009 | Kawasaki |
| 2009/0278153 | A1 | 11/2009 | Cho |
| 2010/0164037 | A1 | 7/2010 | Jung |
| 2011/0008920 | A1 | 1/2011 | Yin et al. |
| 2011/0037887 | A1 | 2/2011 | Lee et al. |

FOREIGN PATENT DOCUMENTS

JP        S60262458 A    12/1985

* cited by examiner

*Primary Examiner* — Mahidere Sahle
(74) *Attorney, Agent, or Firm* — Eschweiler & Associates, LLC (57) ABSTRACT

A method for fabricating a micro lens array is provided. The method includes forming a first lens material structure on a substrate. The first lens material structure includes a plurality of elevated portions. The elevated portions are separated by recesses. Moreover, the plurality of elevated portions have an average height of at least 3 micrometers. Furthermore, the method for fabricating a micro lens array includes depositing a dielectric material on the first lens material structure and the recesses to form a second lens material structure. The second lens material structure has an average thickness of at least 1 micrometer. Moreover, the first and second lens material structures form together the micro lens array.

25 Claims, 10 Drawing Sheets

FABRICATION OF MICRO LENSES

FIELD

Some embodiments of the present invention are related to a micro lens array. Some embodiments of the present invention are related to a method for fabricating a micro lens array.

BACKGROUND

Micro lenses become more and more important. In particular, in the field of semiconductors, micro lenses play an important role. A typical application of micro lens arrays is, for example, the use of micro lens arrays for focusing light on photo sensitive materials. Generally, micro lenses on semiconductor products are used to focus the incoming light onto layers below, which can convert the light into electrical signals for further processing. These layers may, for example, be photosensitive material layers. Using micro lens arrays together with a semiconductor product allows processing incoming light, e.g. by employing the micro lens array in a complementary metal oxide semiconductor (CMOS) image sensor.

With a growing number of applications comes the need to efficiently manufacture micro lenses on semiconductor products.

One common method of manufacturing would be to fabricate the micro lenses in a first processing step. In a further processing step, the micro lenses might be glued on the semiconductor chip.

However, there is a need to provide efficient methods of fabricating micro lens arrays on semiconductor products. The methods of fabricating a micro lens array should allow fabricating a plurality of micro lenses on semiconductor substrates.

SUMMARY

Some embodiments provide a method for fabricating a micro lens array. The method for fabricating a micro lens array comprises forming a first lens material structure on a substrate. The first lens material structure comprises a plurality of elevated portions. The elevated portions are separated by recesses. Moreover, the plurality of elevated portions have an average height of at least 3 micrometers. Furthermore, the method for fabricating a micro lens array comprises depositing a dielectric material on the first lens material structure and the recesses to form a second lens material structure. The second lens material structure has a minimum thickness of at least 1 micrometer. Moreover, the first and second lens material structures form together the micro lens array.

Other embodiments provide a micro lens array. The micro lens array is produced by a method comprising the step of forming a first lens material structure on a substrate. The first lens material structure comprises a plurality of elevated portions that are separated by recesses. Moreover, the plurality of elevated portions have an average height of at least 3 micrometers. Furthermore, the method comprises the further step of depositing a dielectric material with a minimum thickness of at least 1 micrometer on the first lens material structure and the recesses to form a second lens material structure. The first and second lens material structures form together the micro lens array.

In another embodiment a micro lens array is provided. The micro lens array comprises a first lens material structure on a substrate. The first lens material structure comprises a plurality of elevated portions that are separated by recesses. Furthermore, the plurality of elevated portions has an average height of at least 3 micrometers. Moreover, the micro lens array comprises a second lens material structure on the first lens material structure and the recesses. The second lens material structure comprises a dielectric material. Furthermore, the second lens material structure has a minimum thickness of at least 1 micrometer. The first and the second lens material structures form together the micro lens array.

BRIEF DESCRIPTION OF THE DRAWINGS

Embodiments of the present invention are described herein making reference to the appended drawings.

Equal or equivalent elements or elements with equal or equivalent functionality are denoted in the following description by equal or equivalent reference numerals.

DETAILED DESCRIPTION

FIGS. 1a-1e illustrate cross sections through a lens material on a substrate at different stages of a manufacturing process according to an embodiment.

Figure 1A:
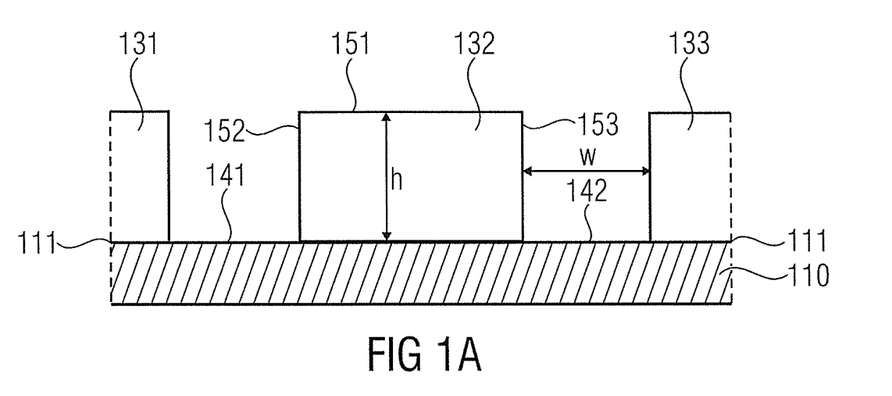
FIGS. 1a-1e depict cross sections through lens material on a substrate at different stages of a manufacturing process according to an embodiment.

FIG. 1a depicts a substrate 110. The substrate may comprise a substrate layer comprising crystalline silicon, for example. Moreover, the substrate 110 may comprise one or more underlayers between the lens material and the substrate layer. In FIG. 1a, a first lens material structure has already been formed on the substrate 110.

The first lens material structure comprises a plurality of elevated portions 131, 132, 133 that may comprise a dielectric material, e.g., silicon dioxide. Silicon dioxide is a particularly suitable lens material. However, the first lens material structure may also or alternatively comprise other suitable lens materials, such as polycarbonate.

The elevated portion 132 comprises three side faces 151, 152, 153, a horizontal side face 151 on top of the elevated portion 132 and two vertical side faces 152, 153. In other embodiments, an elevated portion may e.g. have slanted side faces. The elevated portions 131, 132, 133 are separated by recesses 141, 142, that may be formed by etching into the first lens material structure. This will be explained in more detail below with reference to FIGS. 2a-2f.

In FIG. 1a, an arrow h depicts a height of the elevated portion 132. An arbitrary location on a side face 151, 152, 153 of an elevated portion 132 is referred to as a point on the elevated portion 132. The distance between a point on the elevated portion 132 and the surface 111 of the substrate 110 is the length of a shortest line between the point on the elevated portion 132 and the surface 111 of the substrate 110. The height of an elevated portion 132 is the greatest distance when considering all distances between each point on the elevated portion 132 and the surface 111 of the substrate 110.

The average height of the elevated portions 131, 132, 133 is the average of the heights of all elevated portions 131, 132, 133 that are arranged on the substrate 110.

The minimum recess width of the recess between the elevated portion 132 and the elevated portion 133 is depicted by an arrow w. The minimum distance between two neighboring elevated portions that are separated by a recess is the minimum recess width of the considered recess. The minimum recess width is the smallest recess width of all recesses between all elevated portions on the substrate.

In FIG. 1a, a deposition of dielectric material has not been started, yet.

Figure 1B:
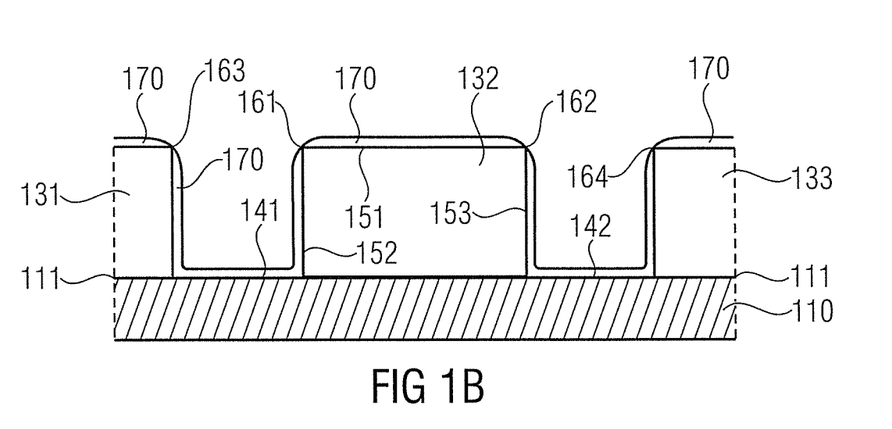

FIG. 1b illustrates a subsequent manufacturing stage, wherein the deposition of the dielectric material 170 on the first lens material structure has just been started. In general, the dielectric material 170 is conformally deposited on the first lens material layer. Thus, the dielectric material 170 already deposited has equal thickness in most areas of deposition. However, near the edges 161, 162, 163, 164 of the elevated portions 131, 132, 133, less dielectric material 170 is deposited than in other areas. Therefore, a rounding effect begins to occur near the edges 161, 162, 163, 164 of the elevated portions 131, 132, 133 of the first lens material structure. As a result, the deposited dielectric material 170 near the edges 161, 162, 163, 164 of the elevated portions 131, 132, 133 does not exhibit sharp edges. Instead, the transitions from vertical side faces to horizontal side faces of the surface of the deposited dielectric material 170 become rounded.

The dielectric material of the second lens material structure may be conformally deposited by applying a chemical vapor deposition (CVD). A chemical vapor deposition is a chemical process employed for depositing solid materials. A substrate may, e.g., be exposed to a source gas. The dielectric material may be deposited by employing a TEOS-chemical vapor deposition (TEOS=tetraethylorthosilicate). The substrate 110 is exposed to the TEOS source gas. The source gas reacts on the surface of the substrate 110 and produces silicon dioxide as a deposit.

Figure 1C:
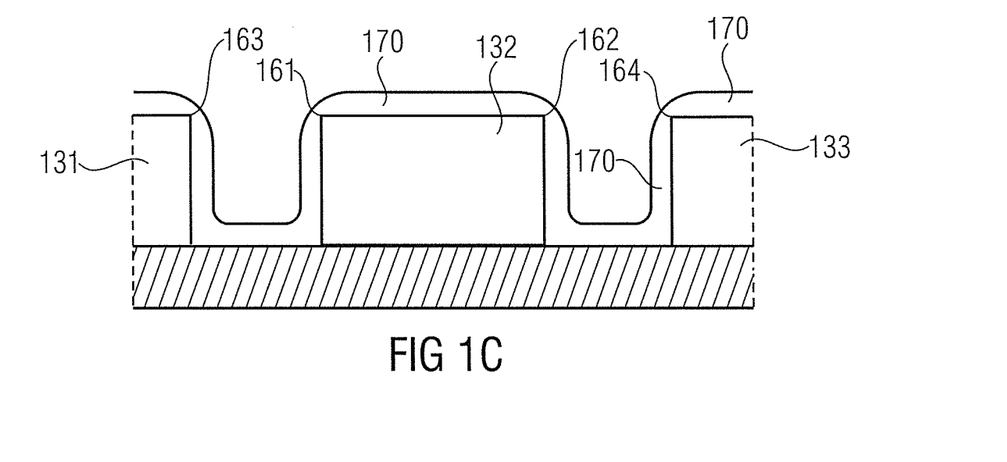

FIG. 1c illustrates a subsequent stage of the deposition process. More dielectric material has been deposited on the elevated portions 131, 132, 133 and the recesses. The above-described rounding effect regarding the deposited dielectric material 170 near the edges 161, 162, 163, 164 of the elevated portions 131, 132, 133 increases.

Figure 1D:
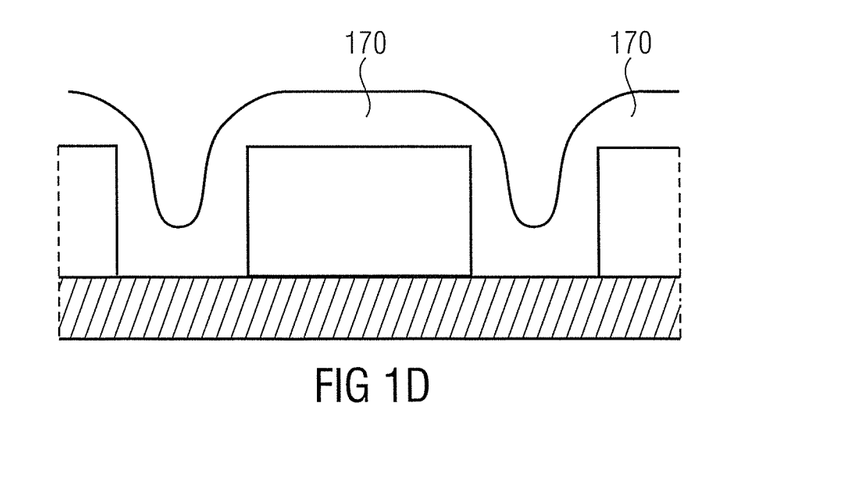

FIG. 1d depicts a subsequent manufacturing stage, wherein more dielectric material 170 is deposited. The gaps of the dielectric material 170 formed on the recesses become smaller with more dielectric material 170 being deposited.

Figure 1E:
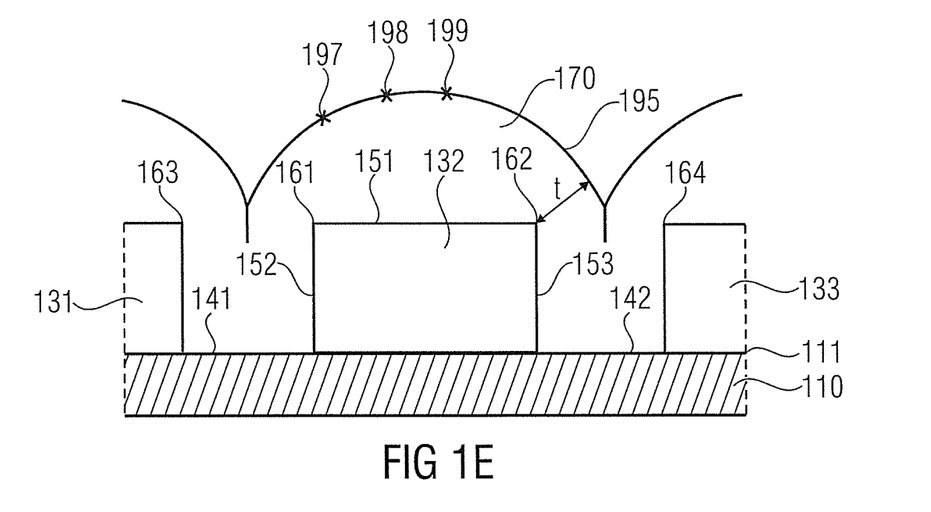

FIG. 1e illustrates the final stage after deposition of the dielectric material 170 has been completed. The dielectric material has been deposited on the first lens material structure and the recesses 141, 142 such that the first lens material structure is completely covered by the deposited material. The rounding effect that started in areas near the edges 161, 162, 163, 164 of the elevated portions 131, 132, 133 now occurs at the whole surface of the deposited dielectric material 170.

The dielectric material 170 that has been deposited on the elevated portions and the recesses forms a second lens material structure. The first lens material structure comprising the elevated portions 131, 132, 133 and the second lens material structure form together the micro lens array.

The second lens material structure has a surface 195. An arbitrary location on the surface 195 of the second lens material structure is referred to as a point on the surface 195 of the second lens material structure. The surface 195 of the second lens material structure comprises an infinite number of points, for example, points 197, 198, 199.

When forming the lens material array, it is desired to form micro lenses having predetermined properties. For example, it is desirable that the micro lenses to be generated have a predetermined focal length, a predetermined lens radius. A lot of lens properties depend on the shape of the micro lens array. It is therefore appreciated to manufacture a micro lens array with a predetermined shape.

The shape of the second lens material structure depends on the minimum thickness of the deposited dielectric material 170 forming the second lens material structure. The minimum thickness of the dielectric material is determined with respect to the elevated portions 131, 132, 133 of the first lens material layer. The distance between a point 197, 198, 199 on the surface 195 of the second lens material structure and the elevated portions 131, 132, 133 of the first lens material structure is the length of a shortest line connecting the point 197, 198, 199 and one of the elevated portions 131, 132, 133. The minimum thickness of the dielectric material 170 (which forms the second lens material structure) is the shortest distance when considering all distances between each point 197, 198, 199 on the surface 195 of the second lens material structure and one of the elevated portions 131, 132, 133 of the first lens material structure. In FIG. 1e, an arrow t indicates a shortest line between a point on the surface 195 of the second lens material structure and one of the elevated portions 131, 132, 133. Therefore, the arrow t depicts the minimum thickness of the dielectric material. It should be noted that the terms "minimum thickness of the second lens material structure" and "minimum thickness of the deposited dielectric material" have the same meaning within this document.

The shape of the second lens material structure 150 after deposition depends on the shape of the elevated portions 131, 132, 133, the recesses 141, 142 and on the thickness of the deposited lens material 170. On one hand, the elevated portions should at least have a certain minimum height, so that a lens shape of the second lens material structure is generated when depositing the dielectric material on the elevated portions and the recesses. Moreover, the second lens material structure should at least have a certain thickness, so that, with respect to the second lens material structure, a sufficient rounding effect occurs at the corners of the elevated portions. Based on these findings, the following embodiments are provided so that the second lens material structure can be formed.

To reduce diffraction regarding optical radiation, e.g. light falling onto the to be generated micro lenses, the elevated portions should have a height that is significantly greater than the wavelength of optical radiation, e.g. greater than the wavelength of the visible radiation (the wavelength of the visible radiation is approximately in the range from 380 to 780 nanometers). According to an embodiment, the elevated portions have an average height of at least 3 micrometers. The average height of the elevated portions that depends on the depth of the etched recesses can, for example, be adjusted when forming the first lens material structure on the substrate. For example, it may be necessary that the first lens material structure is arranged on the substrate with a minimum thickness of at least 3 micrometers.

According to a further embodiment, the second lens material structure has a minimum thickness of at least 1 micrometer. Such a minimum thickness again reduces diffraction effects. The thickness of the dielectric material may, for example, be controlled by adjusting the duration of the step of depositing the dielectric material on the first lens material structure. The longer the deposition of the dielectric material on the first lens material structure continues, the thicker the second lens material structure will be.

In another embodiment, the elevated portions have an average height of at least 3 micrometers and the second lens material structure has a minimum thickness of at least 1 micrometer.

Furthermore, the shape of the second lens material structure deposited on the elevated portions and the recesses may depend on the minimum recess width. The minimum recess width corresponds to the minimum distance (which might be referred to as "minimum gap") between adjacent elevated portions. If the recess width is too small, only a small amount of the dielectric material will be deposited in the recesses. Instead, it is advantageous that the recesses at least have a minimum recess width so that a sufficient degree of the dielectric material is also deposited in the recesses and such that the second lens material structure is formed with a desired lens shape.

In an embodiment, the recesses have at least a minimum recess width of at least 2 micrometers. Such a minimum recess width is particularly suitable for forming the second lens material structure having a desired lens shape.

Moreover, the shape of the second lens material structure depends on the ratio of the minimum recess width to the average height of the elevated portions. The ratio of the minimum recess width w to the average height h of the elevated portions is calculated by dividing the minimum recess width w by the average height of the elevated portions h such that the ration is w/h. The ratio of the minimum recess width to the average height of the elevated portions may be at least 0.75 in one embodiment.

In other embodiments, at least two of the above-mentioned minimum, average or ratio value requirements are combined.

The efficiency of the micro lenses is determined by the thickness and the material properties of the first and second lens material structure. The efficiency of the second lens material structure moreover depends on the critical dimensions (CD), the pitch (e.g., a center-to-center distance) and the depth of the trench etched (partial etch or complete etch) into the lens material, and the thickness, the shape, and the material properties of the finally (e.g. conformally) deposited dielectric film.

FIGS. 2a-2f illustrates how a first lens material structure may be formed according to an embodiment. Other concepts of fabricating the first lens material structure may be employed as well.

Figure 2A:
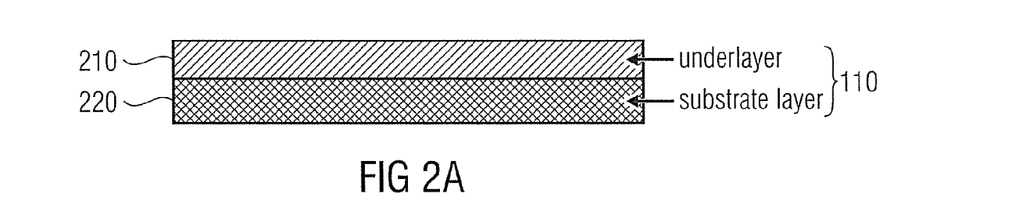
FIGS. 2a-2f illustrate further cross sections through lens material on a substrate at different stages of a manufacturing process according to an embodiment.

FIG. 2a illustrates a cross section through a substrate. The substrate comprises an underlayer 210 and a substrate layer 220.

Furthermore, the substrate may comprise photo sensitive material layers for receiving and further processing incoming light. The underlayer 210 may comprise color filters, for example, one or more red color filters that are transparent for red light, one or more green color filters, that are transparent for green light and one or more blue color filters that are transparent for blue light. Moreover, the substrate may comprise electro-optical elements, e.g. photo diodes, photo transistors or light dependent resistors, and may comprise trigger circuits for outputting electrical and/or optical signals depending on incoming light.

In the processing step illustrated by FIG. 2a, the first lens material layer has not yet been arranged on the substrate.

Figure 2B:
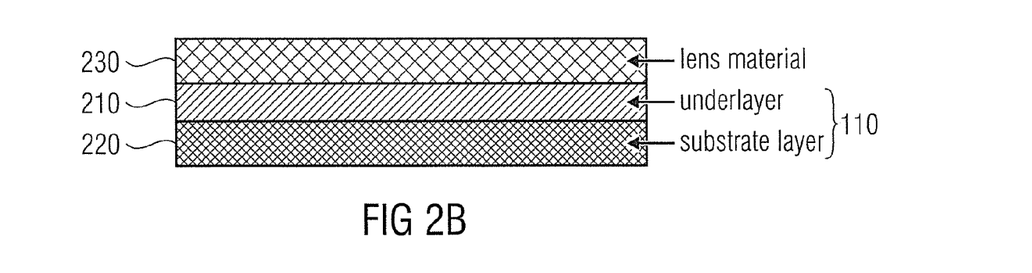

FIG. 2b depicts a cross section after a subsequent processing step in which a first lens material structure 230 has been arranged on the substrate, e.g. on the underlayer 210 of the substrate. The first lens material structure 230 may have been arranged on the substrate by depositing a lens material. In an embodiment, the first lens material structure 230 may comprise silicon dioxide. The lens material may be deposited on the substrate by a conformal deposition. According to an embodiment, the first lens material may be deposited on the substrate by employing a chemical vapor deposition, e.g., by employing a TEOS-CVD (tetraethylorthosilicate chemical vapor deposition). According to an embodiment, the underlayer 210 is a plain layer. As a chemical vapor deposition is a conformal deposition, the first lens material structure 230 resulting from the deposition is also a plain layer. However, in other embodiments, the underlayer 210 is not a plain layer and the first lens material structure 230 resulting from the deposition is also not a plain layer.

Figure 2C:
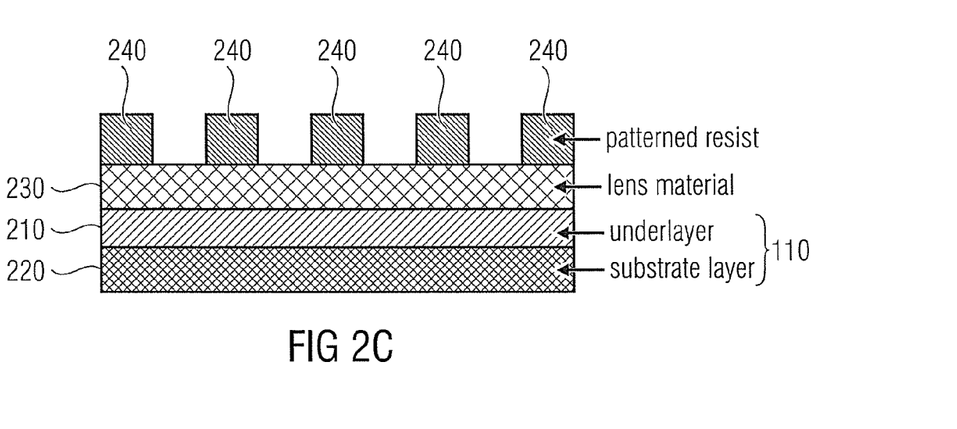

FIG. 2c depicts a cross section after arranging a patterned resist 240 on the first lens material structure 230. In an embodiment, an unpatterned resist may be arranged on the first lens material structure and the patterned resist 240 may be generated from the unpatterned resist by conducting lithography, e.g. semiconductor lithography. A photo mask may be employed to generate a pattern on the unpatterned resist. Arranging a patterned resist 240 on the first lens material structure 230 supports the subsequent processing step of etching into the first lens material structure 230.

Figure 2D:
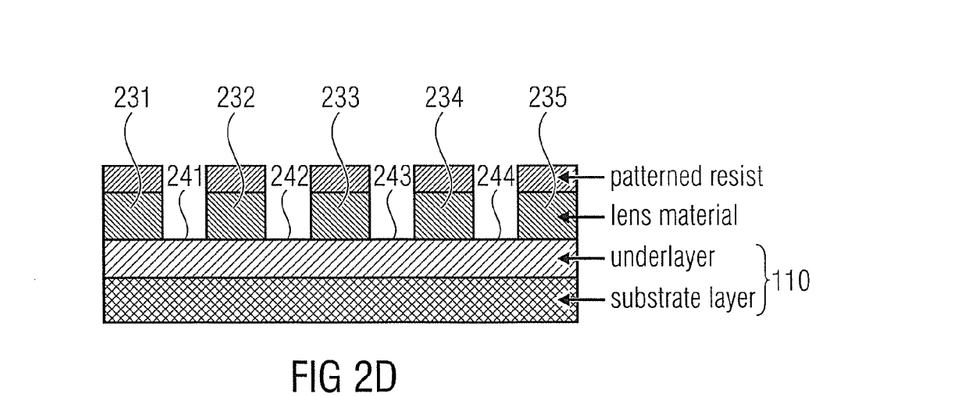

FIG. 2d illustrates a cross section after the processing step of etching into the first lens material structure. In the embodiment depicted by FIG. 2d, all those portions of the first lens material structure not covered by the patterned resist have been completely removed by the etching. All portions of the first lens material structure covered by the patterned resist remain on the substrate as they have been unaffected by the etching. In the embodiment illustrated in FIG. 2d, the lens material of the first lens material structure not covered by the patterned resist has been completely removed so that a complete etch has been conducted. Etching has been conducted until an underlying layer of the substrate has been reached. In other embodiments, a partial etch is conducted and the lens material of the first lens material structure not covered by the patterned resist is not completely removed.

In the embodiment depicted in FIG. 2d, etching generates a plurality of recesses in the first lens material structure. The remaining lens material of the first lens material structure forms elevated portions 231, 232, 233, 234, 235 between the etched recesses 241, 242, 243, 244. The generated elevated portions 231, 232, 233, 234, 235 and recesses 241, 242, 243, 244 depend on the pattern of the patterned resist.

Etching into the lens material of the first lens material structure may be referred to as trench etching. Dry etching may be employed to remove only those portions of the lens material which are not covered by the patterned resist. The lens material may be exposed e.g. to reactive gases. E.g., plasma etching may be employed. However, in other embodiments, wet etching may alternatively be employed to form elevated portions of the first lens material structure by etching into the lens material.

Figure 2E:
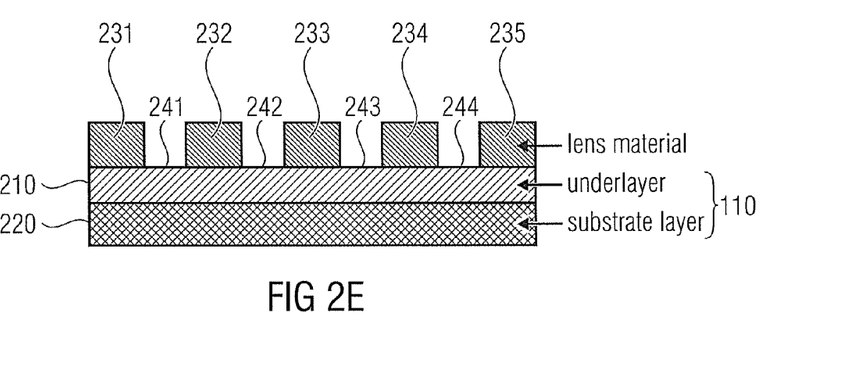

FIG. 2e illustrates a cross section after the step of removing the patterned resist from the first lens material structure. Resist stripping may be accomplished by employing a conventional resist stripping method. In FIG. 2e, the first lens material structure is shown that has been formed on a substrate. The first lens material structure comprises a plurality of elevated portions that are separated by recesses.

Figure 2F:
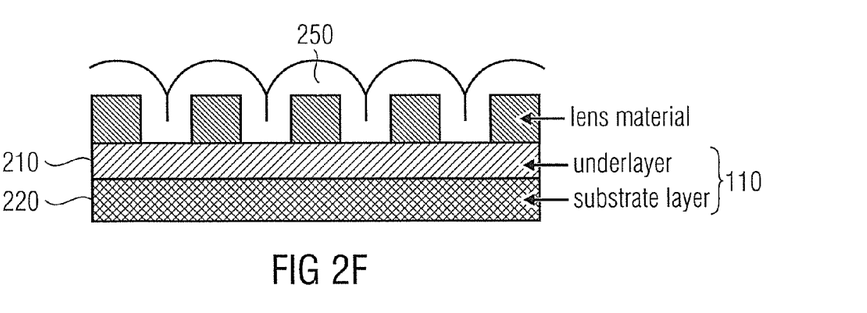

FIG. 2f depicts a cross section after depositing a dielectric material on the elevated portions and the recesses. The step of depositing the dielectric material on the elevated portions and the recesses may be conducted as described with respect to FIGS. 1a-1e.

Figure 3:
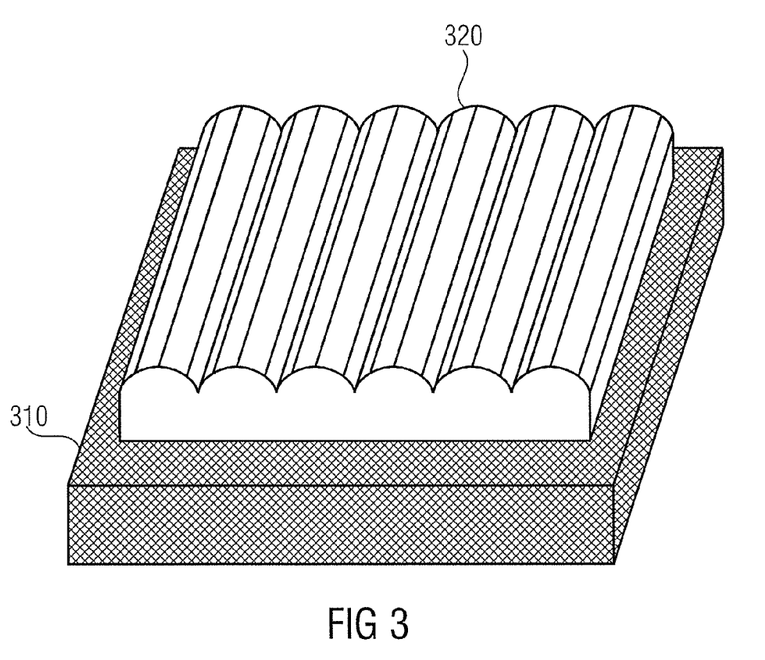
FIG. 3 depicts a three-dimensional illustration of a generated micro lens array on a substrate according to an embodiment.

FIG. 3 illustrates a three-dimensional illustration of a generated micro lens array 320 on a substrate 310 according to an embodiment. The fabricated micro lens array 320 comprises a plurality of six longitudinal micro lenses on a substrate 310.

Figure 4A:
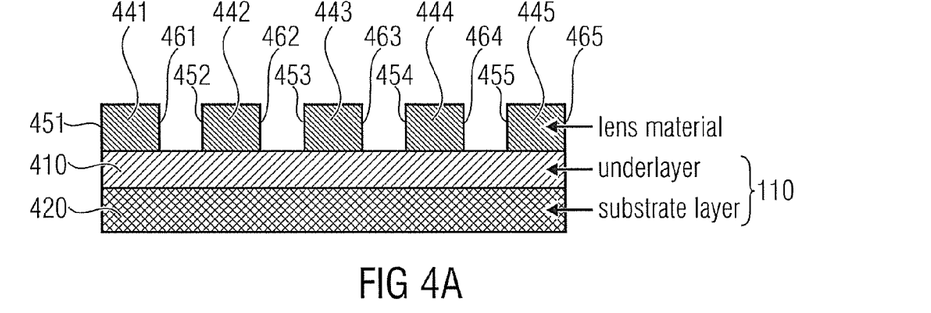
FIGS. 4a-4b show cross sections through lens material on a substrate at different stages of a manufacturing process according to a further embodiment.
Figure 4B:
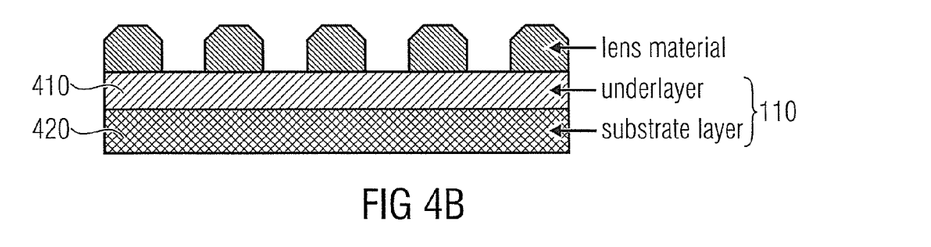

FIGS. 4a-4b illustrate a further embodiment, wherein the first lens material structure comprises at least partially slanted or tapered profiles.

FIG. 4a illustrates a cross section through a first lens material structure on a substrate which comprises an underlayer 410 and a substrate layer 420. In FIG. 4a, five elevated portions of the first lens material layer are illustrated. Each one of the elevated portions comprises three side faces, a horizontal side face 441, 442, 443, 444, 445 and two vertical side faces 451, 461, 452, 462, 453, 463, 454, 464, 455, 465.

FIG. 4b depicts a cross section through the first lens material structure on the substrate after a subsequent processing step. The lens material has been partially removed from the side faces of the elevated portions, such that the first lens material structure comprises partially tapered profiles. In other embodiments, a completely slantered or tapered profile may be provided. Introduction of taper may be achieved e.g. by physical exposure of the respective portions of the first lens material structure to an inert gas plasma. Plasma etching may be conducted to remove lens material from the first lens material structure to generate the tapered profile. In an embodiment, an argon plasma may be employed.

Providing the first lens material layer with at least a partially slantered or tapered profile is advantageous. When depositing the dielectric material on the first material structure, the shape that the second lens material structure will exhibit after depositing the dielectric material can be adjusted by providing respectively (partially) slantered or tapered profiles.

Figure 5A:
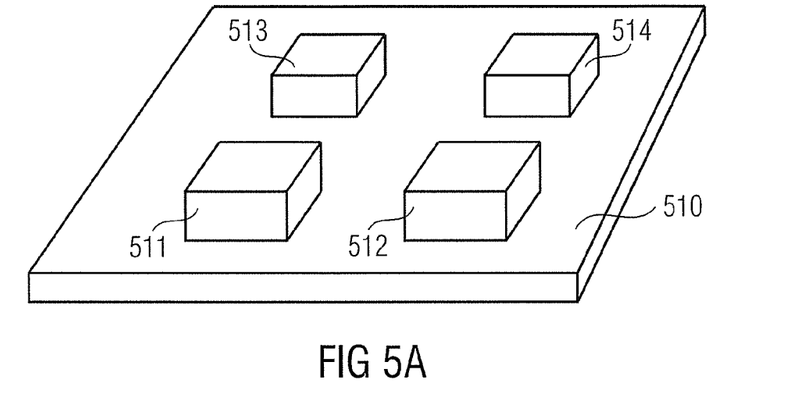
FIGS. 5a-5d depicts three-dimensional illustrations of elevated portions on a substrate according to an embodiment, wherein the elevated portions have different shapes.

FIG. 5a illustrates a three-dimensional view on the first lens material structure after the elevated portions 511, 512, 513, 514 of the first lens material structure have been arranged on the substrate 510. The elevated portions have a rectangular footprint. The length l of a rectangular footprint may be different from a width d of the rectangular footprint of an elevated portion, e.g. the elevated portion 512.

Figure 5B:
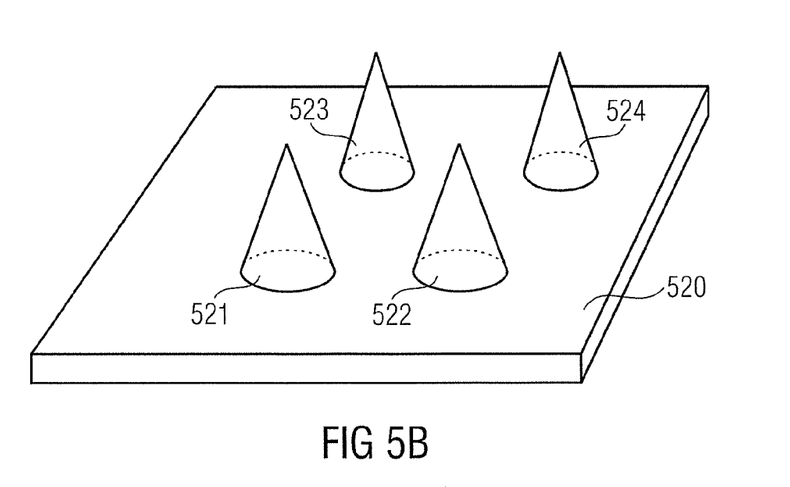

FIG. 5b illustrates a three-dimensional view on the first lens material structure on a substrate 520, wherein elevated portions 521, 522, 523, 524 have a cone shape.

Figure 5C:
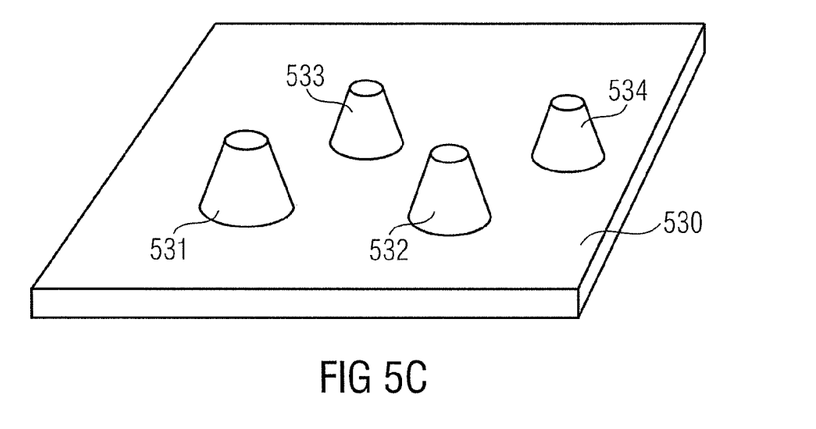

FIG. 5c depicts a three-dimensional view, wherein elevated portions 536, 537, 538, 539 on a substrate 530 have the shape of truncated cones.

Figure 5D:
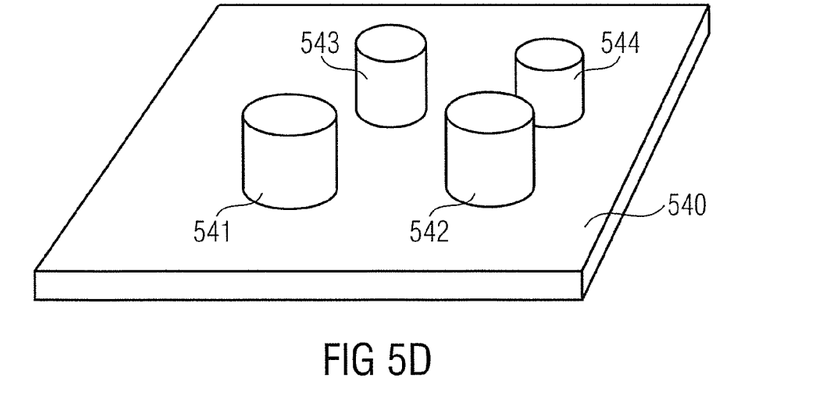

However, the elevated portions may also exhibit a different shape. For example, FIG. 5d illustrates elevated portions 541, 542, 543, 544 arranged on a substrate 540 according to an embodiment, which exhibit a cylindrical shape.

The footprint of the elevated portions may, for example, be rectangular, elliptical or circular.

According to an embodiment, a micro lens array is provided comprising a first lens material structure on a substrate. The first lens material structure comprises a plurality of elevated portions that are separated by recesses, wherein the plurality of elevated portions have an average height of at least 3 micrometers. Furthermore, the micro lens array comprises a second lens material structure on the first lens material structure and the recesses, wherein the second lens material structure comprises a dielectric material and wherein the second lens material structure has an minimum thickness of at least 1 micrometer, wherein the first and second lens material structure form together the micro lens array.

In another embodiment, a micro lens array may be provided, produced according to one of the above-described methods of fabrication.

Although specific embodiments have been illustrated and described herein, it will be appreciated by those of ordinary skill in the art that a variety of ordinate and/or equivalent implementations may be substituted for the specific embodiments shown and described without departing from the scope of the present invention. This application is intended to cover any adaption or variations of those specific embodiments discussed herein.

The invention claimed is:

1. A method for fabricating a micro lens array, comprising:
   forming a first lens material structure on a substrate, wherein the first lens material structure comprises a plurality of elevated portions having corners associated therewith that are separated by recesses, wherein the plurality of elevated portions have an average height of at least 3 micrometers, and
   depositing a dielectric material with a minimum thickness of at least 1 micrometer on the first lens material structure for covering a top of the plurality of elevated portions and on the recesses to form a second lens material structure, wherein the first and second lens material structure form together the micro lens array.

2. The method according to claim 1, wherein the recesses have a minimum recess width of at least 2 micrometers.

3. The method according to claim 2, wherein a ratio of the minimum recess width to the average height of the elevated portions is at least 0.75.

4. The method according to claim 1, wherein forming the first lens material structure on a substrate comprises etching at least partially into a lens material of the first lens material structure.

5. The method according to claim 1, wherein forming the first lens material structure on a substrate comprises etching into the lens material of the first lens material structure until reaching an underlying layer.

6. The method according to claim 1, wherein the first lens material structure is formed to comprise a plurality of elevated portions with a rectangular, elliptical or circular footprint.

7. The method according to claim 1, wherein forming the first lens material structure further comprises:
   arranging a lens material on a substrate as a first lens material structure;
   forming a patterned resist on the first lens material structure; and
   etching into the first lens material structure in areas not covered by the patterned resist.

8. The method according to claim 7, further comprising:
   removing the patterned resist from the first lens material structure after the etching.

9. The method according to claim 1, wherein depositing the dielectric material on the first lens material structure is conducted by a TEOS-chemical vapor deposition process.

10. The method according to claim 1, wherein the first lens material structure and the second lens material structure comprise the same lens material or different lens materials that have optically equivalent characteristics.

11. The method according to claim 1, wherein at least one of the first lens material structure and the second lens material structure comprise silicon dioxide.

12. The method according to claim 1, wherein forming the first lens material structure further comprises removing a part of the lens material from at least on side face of the first lens material structure such that the first lens material structure comprises at least partially slanted or tapered profiles.

13. A micro lens array, produced by a method of:
forming a first lens material structure on a substrate, wherein the first lens material structure comprises a plurality of elevated portions having corners associated therewith that are separated by recesses, wherein the plurality of elevated portions have an average height of at least 3 micrometers, and
depositing a dielectric material with a minimum thickness of at least 1 micrometer on the first lens material structure for covering a top of the plurality of elevated portions and the recesses to form a second lens material structure;
wherein the first and second lens material structure form together the micro lens array.

14. The micro lens array according to claim 13, wherein the recesses have a minimum recess width of at least 2 micrometers, and wherein a ratio of the minimum recess width to an average height of the elevated portions is at least 0.75.

15. The micro lens array according to claim 14, wherein the first lens material structure comprises a plurality of elevated portions with a rectangular, elliptical or circular footprint.

16. The micro lens array according to claim 13, wherein the first lens material structure and the second lens material structure comprise the same lens material or different lens materials that have optically equivalent characteristics.

17. The micro lens array according to claim 13, wherein at least one of the first lens material structure and the second lens material structure comprise silicon dioxide.

18. A micro lens array, comprising:
a first lens material structure on a substrate, wherein the first lens material structure comprises a plurality of elevated portions having corners associated therewith that are separated by recesses, wherein the plurality of elevated portions have an average height of at least 3 micrometers, and
a second lens material structure on the first lens material structure and the recesses, wherein the second lens material structure comprises a dielectric material wherein a top plurality of elevated portions are covered by the dielectric material, and wherein the second lens material structure has a minimum thickness of at least 1 micrometer, wherein the first lens material structure and the second lens material structure form together the micro lens array.

19. The micro lens array according to claim 18, wherein the recesses have a minimum recess width of at least 2 micrometers.

20. The micro lens array according to claim 19, wherein a ratio of the minimum recess width to an average height of the elevated portions is at least 0.75.

21. The micro lens array according to claim 18, wherein the first lens material structure and the second lens material structure comprise the same lens material or different lens materials that have optically equivalent characteristics.

22. The micro lens array according to claim 18, wherein at least one of the first lens material structure and the second lens material structure comprise silicon dioxide.

23. The method according to claim 1, wherein depositing the dielectric material on the first lens material structure and on the recesses is conducted such that the first lens material structure is completely covered by the deposited material.

24. The method according to claim 13, wherein depositing the dielectric material on the first lens material structure and on the recesses is conducted such that the first lens material structure is completely covered by the deposited material.

25. The micro lens array according to claim 18, wherein the first lens material structure is completely covered by the deposited material.

* * * * *

UNITED STATES PATENT AND TRADEMARK OFFICE
CERTIFICATE OF CORRECTION

| | | |
|---|---|---|
| PATENT NO. | : 9,030,744 B2 | Page 1 of 1 |
| APPLICATION NO. | : 13/235707 | |
| DATED | : May 12, 2015 | |
| INVENTOR(S) | : Manfred Engelhardt | |

It is certified that error appears in the above-identified patent and that said Letters Patent is hereby corrected as shown below:

In the Claims

Column 8, Claim 12, Line 65 Please replace "...at least on side face..." with --...at least one side face...--

Signed and Sealed this
Fifteenth Day of September, 2015

Michelle K. Lee
*Director of the United States Patent and Trademark Office*